United States Patent [19]

Berg et al.

[11] Patent Number: 4,895,226
[45] Date of Patent: * Jan. 23, 1990

[54] VEHICLE AUTOMATIC SLACK ADJUSTER

[75] Inventors: Arthur A. Berg, Northbrook, Ill.; Frederic Lissau, deceased, late of Chicago, Ill., by Edith Lissau, executrix

[73] Assignee: Midland Brake, Inc., Kansas City, Mo.

[*] Notice: The portion of the term of this patent subsequent to Oct. 1, 2002 has been disclaimed.

[21] Appl. No.: 766,590

[22] Filed: Aug. 19, 1985

[51] Int. Cl.⁴ ............................................. F16D 65/56
[52] U.S. Cl. ............................. 188/79.55; 188/79.51; 188/79.53
[58] Field of Search ................. 188/79.5 K, 79.5 GE, 188/79.56 S, 79.51, 79.53, 79.55, 79.56, 79.57, 79.58, 79.62, 79.54

[56] References Cited

U.S. PATENT DOCUMENTS

| | | | |
|---|---|---|---|
| 1,661,191 | 3/1928 | Midboe | 188/79.5 K |
| 2,920,724 | 1/1960 | Margetic et al. | 188/79.5 K |
| 3,342,293 | 9/1967 | Hildebrand et al. | 188/79.5 K |
| 3,351,163 | 11/1967 | Sander et al. | 188/79.5 K |
| 4,394,892 | 7/1983 | Mizusawa | 188/79.5 K |
| 4,544,046 | 10/1985 | Lissau | 188/79.5 K |

Primary Examiner—Andres Kashnikow
Assistant Examiner—Matthew C. Graham
Attorney, Agent, or Firm—Neuman, Williams, Anderson & Olson

[57] ABSTRACT

An automatic slack adjuster for over-the-road vehicle brakes is adapted to be mounted between the brake chamber and brake operating shaft, for example an operating shaft known as an S cam shaft. The slack adjuster includes a body having a lever arm pivotally connected thereto, which lever arm is connected to the brake chamber through a brake operating rod. A drive member is fixed onto the brake operating shaft and is movably positioned within the body. There is an adjustable connection between the lever arm and the drive member for adjusting the relationship between the drive member and body in response to the body movement required for a brake application. The adjustable connection provides for incremental adjustment and is responsive, during brake application movement of the lever, for both sensing and taking up a limited amount of slack.

9 Claims, 2 Drawing Sheets

VEHICLE AUTOMATIC SLACK ADJUSTER

SUMMARY OF THE INVENTION

The present invention relates to slack adjusters for use in over-the-road vehicles such as trucks or the like and has particular relation to such a slack adjuster which both senses and takes up slack on brake application movement.

Another purpose is a brake slack adjuster of the type described which is simply constructed and reliably operable.

Another purpose is a brake slack adjuster of the type described utilizing a stepped cam as the means for providing incremental slack adjustment.

Another purpose is a brake slack adjuster of the type described which provides for slack take-up during brake application movement.

Another purpose is a brake slack adjuster of the type described in which the slack adjustment members are embodied in a cartridge which can be attached to and simply removed from the body of the slack adjuster.

Another purpose is a slack adjuster of the type described utilizing a universal connection between the load gears and the adjustment members to both compensate for misalignment and to isolate the adjustment members from load gears at the time the load gears are heavily stressed.

Another purpose is a slack adjuster which eliminates the conventional friction elements to compensate for brake wrap-up movement.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

Figure 1:
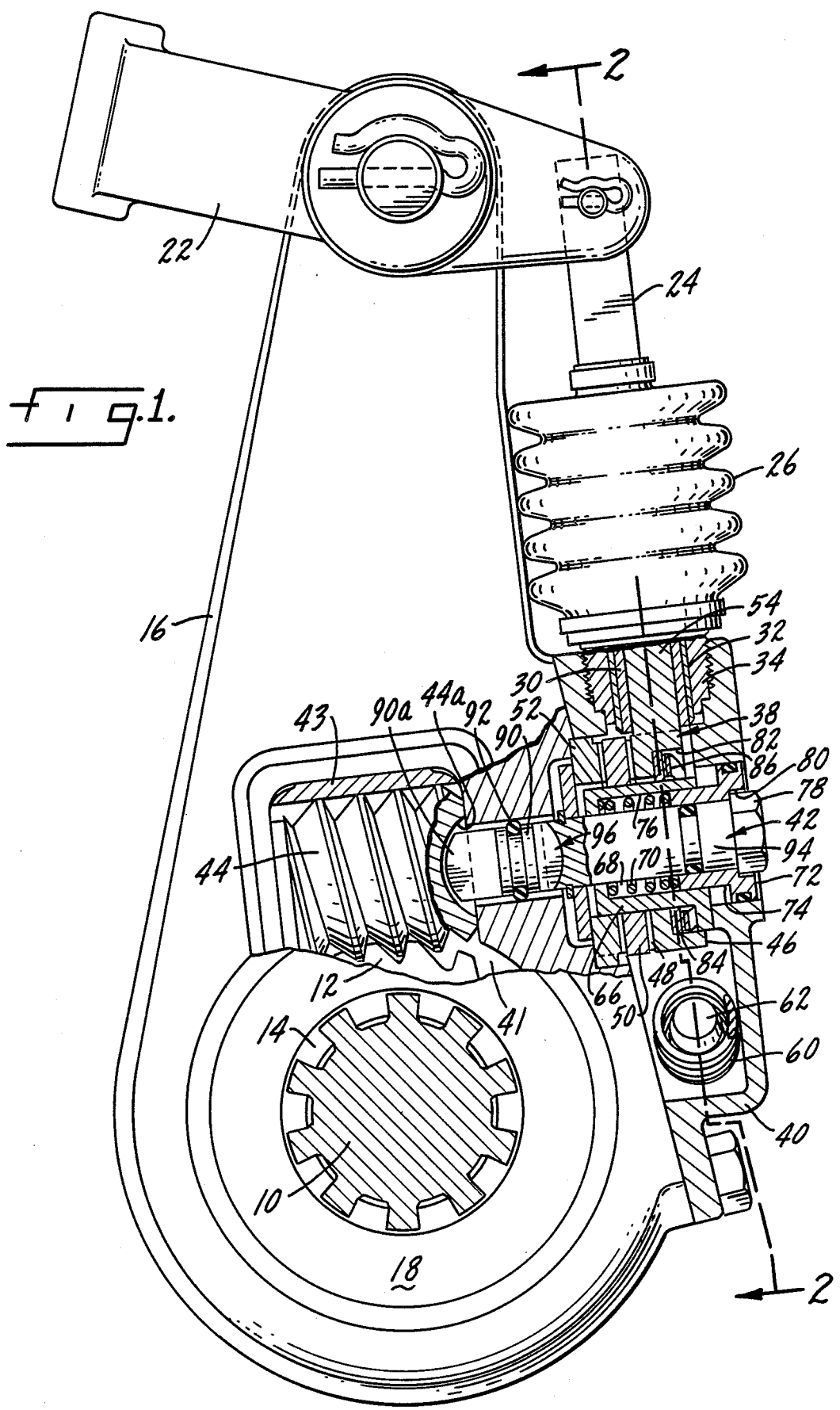
FIG. 1 is a side elevation of a slack adjuster of the type described, showing portions of the slack adjuster in section.

One of the principal problems in automatic slack adjusters of the type used today on over-the-rad vehicles such as trucks or the like is that the slack adjuster may not differentiate between wear on the brake drum and brake drum expansion from overheating. A takeup of slack which appears to be caused by wear, but which in fact is caused by expansion of the brake drum due to heat, can cause subsequent improper operation of the brakes. The present invention solves the problem of differentiation between actual slack caused by brake drum wear and brake drum expansion due to overheating by limiting the amount of slack which may be taken up on any one brake application. Thus, brake drum wear, which will be gradual in nature, can be accomodated by the amount of slack permitted to be taken up in a single brake application. Whereas, expansion of a brake drum caused by overheating, which would be a more abrupt change of the brake drum diameter than that caused by brake drum wear, will not bring about an adjustment by the slack adjuster in an amount more than the increment permitted by the structure disclosed herein. The amount of slack which can be taken up on any one brake application is limited by the cam structure which in turn provides for a single increment of slack take-up, regardless of the amount of slack sensed during a brake application.

The slack adjuster includes load gears which in turn include a worm to which are applied the very substantial forces brought about during brake application. For example, such forces are sufficiently large that there can be as much as 1 1/16 in. of wrap-up when the brakes are applied, which in turn would cause as much as 1 1/16 in. of physical movement of the brake members. The adjustment members, or those members providing the slack adjustment function, do not have the load bearing or load carrying capacity of the load gears and thus it is important that there be some form of isolation between the adjustment members and the load carrying portion of the slack adjuster. As shown herein, such separation is provided by a universal joint. The universal joint also has the advantage that it permits the adjustment members to be embodied in a cartridge or unitary structure which may be simply applied to and removed from the slack adjuster body for servicing. In addition, misalignment caused by the forces applied to the load gear is not applied to the adjustment members due to the universal connection therebetween.

Prior art slack adjusters compensate for the described wrap-up movement by providing friction or slip elements separating the heavier load gears from the more delicate adjustment gears. The present invention permits slack adjustment only if the adjustment arm can follow its associated cam and only if the force from the load gears is less than the force from the adjustment spring.

In the drawings, a shaft is indicated at 10 and is the brake operating shaft of a conventional over-the-road vehicle brake system. The shaft 10 may be what is known in the trade as an S cam shaft in reference to the manner in which the shaft brings about operation of the brakes. A drive member or worm gear 12 having a plurality of spaced inwardly directed splines 14 is connected to shaft 10 with gear 12 being rotatably mounted within a body indicated generally at 16. A side cover plate 18 is mounted to the body and seals may be inserted where required to protect the body interior.

The opposite end of body 16 from worm gear 12 pivotally mounts a yoke 22 which is journaled to the body and will conventionally be connected to or extend outwardly from the brake operating chamber. Yoke 22 is pivotally connected to a link 24 which forms the connection between the slack adjustment apparatus to be described and the yoke which functions as a lever arm.

Figure 2:
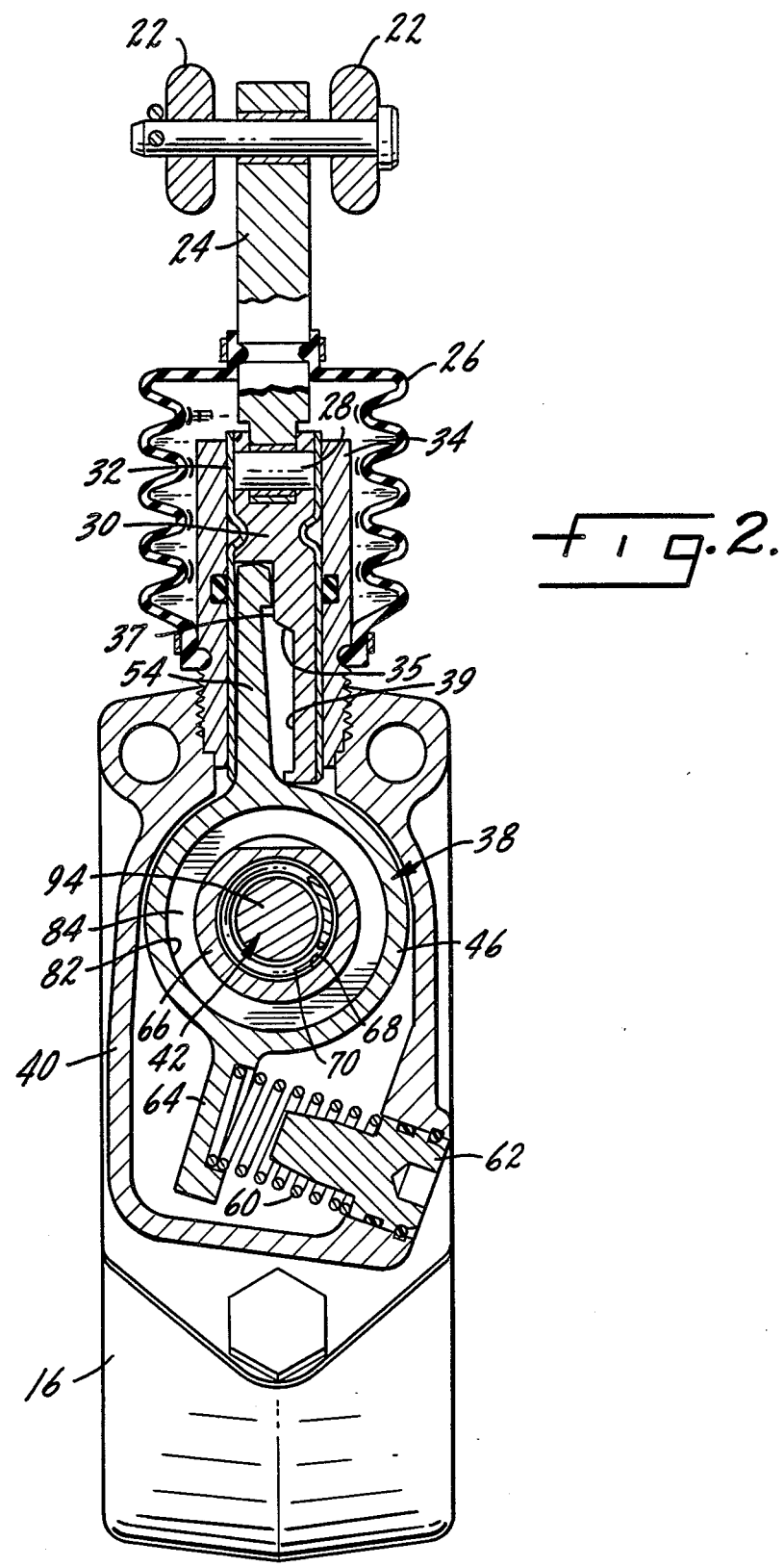
FIG. 2 is a section along plane 2—2 of FIG. 1.

Looking specifically at FIG. 2, link 24 is at least in part enclosed by a protective boot 26 with the link extending into the boot and being pivotally connected therein by a rivet or the like 28 to a sliding cam 30. Cam 30 is attached to and positioned within a tube 32 which is positioned for sliding movement within a bushing 34 attached to body 16. Straight line movement of the cam and its associated tube in accordance with movement of link 24 is assured by bushing 34. Cam 30 has a ramp 35 positioned between two parallel but offset cam surfaces 37 and 39, with the cam surfaces being positioned for contact by an arm portion 54 of an adjustment member 38.

Adjustment member 38 is positioned within a chamber formed by a housing member 40 which is attached by means of suitable fastening members or the like to body 16. Adjustment member 38 is coaxially positioned about a driving bushing or shaft 42, with the inward end of shaft 42 being in driving relationship with a worm 44 which is in engagement with worm gear 12. Accordingly, rotation of shaft 42 will rotate worm 44 which is effective to drive gear 12. The worm gear is positioned within a chamber 41 in body 16 and in some applications an insert 43 is positioned in the chamber to reduce stress concentrations on the body.

Adjustment member 38 has a cylindrical face portion 46 which has a plurality of ratchet teeth 48 thereon, which teeth are in mating engagement with ratchet teeth on an adjustment clutch 50 which is positioned adjacent the cylindrical portion of the adjustment member. The ratchet between adjustment member 38 and adjustment clutch 50 will permit counterclockwise rotation of adjustment member 38 without any consequent rotation of adjustment clutch 50, but will not permit such movement in the clockwise direction without a consequent turning of shaft 42 as explained hereinafter. Positioned adjacent adjustment clutch 50 is a clutch member 52 keyed to body 16, there being a similar ratchet arrangement between members 50 and 52 to the effect that member 50 will not rotate in a counterclockwise direction relative to clutch 52, but is permitted to rotate in a clockwise direction. Thus, the combination of the clutch members and the ratchet connection therebetween, as well as the ratchet connection with adjustment member 38, provides a one-way clutch arrangement, the operation of which in slack adjustment will be described hereinafter.

Adjustment member 38 has a cam arm 54 which rides against cam surfaces 35, 37 and 39 of cam 30. The normal position, when the brakes are unoperated, is for the nose of arm 54 to be positioned against cam surface 37 and the adjustment member is maintained in that position by a coil spring 60 mounted upon a spring support 62, with the spring bearing against a spring arm 64 of adjustment member 38. The spring urges adjustment member 38 in a clockwise direction, but the adjustment member is retained in the position shown by cam surface 37 when the brakes are unoperated. Spring 60 is normally compressed when the adjustment member is assembled in the slack adjuster and thus will urge clockwise rotation of adjustment member 38, when permitted by the position of cam 30, e.g. when the cam has moved upward a distance to permit its nose to move inward to cam surface 39 which takes place when ramp 35 has moved upwardly beyond the nose. The adjustment member can only move in this manner, which will cause a slack takeup, when permitted to do so by the cam and when the brakes are not in a fully applied position.

Coaxially positioned about shaft 42 is a locking bushing 66 which has an internal recess 68 mounting a small coaxially arranged coiled spring 70 which urges a bushing 72 outwardly from or away from the locking bushing. Bushing 72, also coaxially arranged about shaft 42, has an exterior multiflatted surface 74 which may, for example, be octagonal in configuration, which mates with a similar octagonal surface 76 forming a recess 68. Thus, the octagonal or mating mechanical surfaces 74 and 76 form a driving connection between locking bushing 66 and bushing 72.

Shaft 42 has a shaped head 78 which may, for example be hexagonal, and mates with a similar hexagonal interior surface 80 on that portion of bushing 72 which is positioned adjacent head 78. Accordingly, the mating hexagonal surfaces described form a driving connection between bushing 72 and shaft 42.

Formed between recessed areas of the exterior of bushing 66 and the interior of adjustment member 38 is a chamber indicated at 82, in which are a spacer 84 and a series of wave washers 86 which function to urge the adjustment member and the locking bushing in opposite directions and to maintain firm contact of the described ratchet surfaces between adjustment member 38, clutch member 50 and clutch member 52.

There may be a number of seals, which are not specifically designated herein, but which will be provided at conventional locations to perform the customary sealing functions in devices of this type. Those skilled in the art will readily appreciate the function and location of seals in a slack adjuster of this type.

Shaft 42 may be formed in a plurality of sections to provide what is in essence a universal joint to accomodate slight misalignments between the shaft and worm 44. Specifically, there may be an interior shaft section 90 which has a nose 90a extending within an arcuate slot 44a in worm 44. The nose and slot connection are similar to a conventional screwdriver nose and slot configuration other than both the nose and the slot are arcuate. An 0-ring 92 is positioned within a slot or groove in shaft section 90 and is effective to be in sealing contact with the interior of the shaft bore. A further shaft section 94 mounts the end of the shaft including head 78 and is connected to interior shaft section 90 by a similar nose and slot configuration indicated generally at 96. The combination of the two nose and slot connections effectively provide a universal joint between shaft 42 and the worm. The universal connection may be as shown on nose 90a and the nose of connection 96 may be at right angles to each other.

Housing cover 40, as indicated above, is attached to body 16 and may be removed and in so doing will remove all of the slack adjustment mechanism described including shaft section 94, but leaving shaft section 90 in housing 16. This permits the slack adjustment portion of the device to be removed as a unitary assembly or cartridge without removing the entire mechanism from the vehicle brake system, providing for substantial ease in maintenance.

In operation, when the brakes are applied the brake chamber will have an increase in air pressure permitting the brake chamber to cause movement of its associated brake rod which may be connected to yoke 22. Body 16 accordingly will be pivoted in a clockwise direction to transmit corresponding clockwise movement through worm gear 12 to S cam shaft 10 to apply the brakes. As body 16 moves in a clockwise direction, link 24 will be moved upward, which will cause cam 30 to rise. Such rising movement of cam 30 may or may not permit counterclockwise rotation of adjustment member 38, depending upon the amount of upward movement of the cam. In a normal brake application there is the force required to fully apply the brakes to provide for complete contact between the brake drums and the associated brake shoes. Normally, there is also a brake application period described as the wrap-up, after full contact between the brake members, in which the brake application member, in this case yoke 22, will apply a degree of stress or strain to the various elements comprising the brake application mechanical system. Assuming cam 30 has moved a distance, after complete brake application, such that the nose of arm 54 of adjustment member 38 is still in contact with ramp surface 37, there has been no slack sensed in the system and upon release of the brakes, all of the elements will return to their initial position.

If during a brake application cam 30 has moved a distance whereby arm 54 of adjustment member 38 is beyond ramp 35 and opposite cam surface 39, adjustment member 38 and its arm 54 will move in a clockwise direction into contact with surface 39 if the brakes have not been fully applied. If the brakes have been fully applied, the adjustment member cannot move because clockwise movement is prevented by the rigid mechanical connection between shaft 10, worm gear 12, worm 44 and shaft 42. When the brakes are applied, the brake application force will cause a turning force to be applied to worm 44. This rotational force will be applied to shaft 42 and from the shaft to adjustment member 38 through bushing 66 and adjustment clutch 50. This force will move arm 54 away from cam surface 39. Slack can only be taken up when this force is less than that supplied by spring 60 which urges the arm toward the cam.

The present invention eliminated friction or slip means which compensate for wrap-up movement. In the present invention, no slack can be taken up during wrap-up movement because the rational force applied to arm 54 from the load gears overcomes the force from spring 60.

The described ratchet connection between adjustment member 38 and shaft 42 only provides for clockwise movement of the adjustment member and consequent movement of shaft 42, worm 44 and gear 12 from the force of spring 60 if the brakes have not been fully applied. Such movement of the cam, without the brakes being fully applied, would indicate that there is slack in the system which needs to be taken up. Slack is taken up on the brake application portion of the operating cycle and not on brake release as is more customary. The movement of gear 12 relative to body 16 by the described adjustment mechanism brings about the take-up of slack.

If slack is taken up during the brake application cycle when conditions permit, as described above, during brake release cam 30 will move downward and adjustment member 38 will rotate in a counterclockwise direction, as dictated by movement of the cam and its ramp 35, and such counterclockwise rotation of adjustment member 38 will compress spring 60. The rotation of adjustment member 38 is permitted by the ratchet connection between the adjustment member and adjustment clutch 50. The amount of counterclockwise rotation, which will compress the spring as described, and which will place the elements in a position to take up slack on the next brake application cycle if required, is controlled by the teeth of the adjustment clutch. The amount of movement by adjustment member 38 in moving into contact with cam surface 39 is slightly more than the amount of movement permitted by one tooth of the adjustment clutch. Regardless of the travel of cam 30, adjustment member 38 cannot move more than the distance permitted by ramp 35 and this distance is the same as that permitted by the separation between cam surfaces 37 and 39 on cam 30.

Of importance is the fact that slack takeup is accomplished during the brake application cycle rather than on the release cycle and that the amount of slack adjustment in one application of the brakes is that provided by an increment or the size of a tooth on adjustment clutch 50. Although cam ramp 35 is a single surface, it could be multiple surfaces so that the steps or increments could be more finely divided.

Manual slack adjustment is also provided, for example during installation or during the requirements of any mechanical maintenance of the vehicle. Such manual adjustment is brought about by moving bushing 72 inwardly, against the force of spring 70, until the bushing has cleared the hex head of shaft 42. Thereafter, shaft 42 may be mechanically turned, in either the forward or reverse direction, by the hex head thereon, an amount consistent with the desired adjustment of slack. Such adjustment may be either to take up slack or let out slack.

The slack adjuster disclosed herein is totally self-adjusting. If the brakes are too loose, as they are applied over a period of time, there will be an automatic take-up of slack. If they are too tight, there will be no adjustment of slack until there is sufficient wear on the brake shoe to permit the adjuster to function as described.

Whereas the preferred form of the invention has been shown and described herein, it should be realized that there may be many modifications, substitutions and alterations thereto.

The embodiments of the invention in which an exclusive property or privilege is claimed are defined as follows:

1. In an automatic slack adjuster for vehicle brakes adapted to be mounted between the brake chamber and the brake operating shaft, a body, a drive member movable relative to and positioned by said body on the brake operating shaft, a lever arm pivoted to said body, an adjustable connection between said lever arm and drive member for adjusting the relationship between said drive member and body in response to the body movement required for a brake application, said adjustable connection including a stepped cam movable in response to lever arm travel, an adjustment member positioned for contact with said cam and movable in accordance with the position of the cam step to sense and take up a limited amount of slack, spring means urging said adjustment member toward said stepped cam, and a one-way clutch connecting said adjustment member and drive member, with said one-way clutch providing for slack take-up movement of said adjustment member and drive member during brake application movement of said body and brake operating shaft if slack is sensed, and permitting relative movement between said adjustment member and drive member during brake release.

2. The slack adjuster of claim 1 further characterized in that said one-way clutch provides for single increments of movement of said drive member in response to movement of said adjustment member.

3. The slack adjuster of claim 2 further characterized in that said one-way clutch includes a ratchet connection, with the increments of adjustment being provided by said ratchet connection.

4. The slack adjuster of claim 1 further characterized by and including a shaft mechanically positioned between said adjustment member and drive member and mechanically connected to said one-way clutch, and means for disengaging said shaft from said clutch and for providing for manual adjustment of said shaft and drive member.

5. The slack adjuster of claim 4 further characterized in that said shaft is coaxially arranged relative to said adjustment member and is coaxially arranged relative to said one-way clutch, with the means for disengaging said shaft from said clutch including a coaxially arranged bushing mounted on said shaft and forming the driving connection between said one-way clutch and said shaft.

6. The slack adjuster of claim 4 further characterized in that said shaft includes an inner portion and an outer portion and a universal connection therebetween.

7. The slack adjuster of claim 1 further characterized by and including a shaft mechanically positioned between said adjustment member and drive member, said shaft including an inner portion and an outer portion, and a universal connection therebetween.

8. The slack adjuster of claim 7 further characterized in that said adjustment member and the outer portion of said shaft are removable, as a unitary structure, from the slack adjuster for maintenance thereof.

9. The slack adjuster of claim 7 further characterized in that the inner portion of said shaft has a projection and slot connection with the outer portion of said shaft and a projection and slot connection with the drive member.

* * * * *